(12) United States Patent
Wu et al.

(10) Patent No.: US 6,243,711 B1
(45) Date of Patent: Jun. 5, 2001

(54) SCRIPTING LANGUAGE FOR DISTRIBUTED DATABASE PROGRAMMING

(75) Inventors: David Tze-Si Wu, Hacienda Heights; Jeffrey G. Ichnowski, Palo Alto, both of CA (US)

(73) Assignee: eALITY, Inc., Foster City, CA (US)

( * ) Notice: Subject to any disclaimer, the term of this patent is extended or adjusted under 35 U.S.C. 154(b) by 0 days.

(21) Appl. No.: 09/036,316

(22) Filed: Mar. 6, 1998

(51) Int. Cl.$^7$ .................................................... G06F 17/30
(52) U.S. Cl. ............................. 707/104; 707/6; 707/10; 704/1; 704/2
(58) Field of Search ................................. 707/104, 3, 2, 707/5, 4, 522, 513, 516, 526, 6, 10, 507, 517; 364/963; 709/2, 8; 704/1, 2; 345/307

(56) References Cited

U.S. PATENT DOCUMENTS

| | | | |
|---|---|---|---|
| 5,455,945 | * 10/1995 | VanderDrift | 707/2 |
| 5,717,913 | * 2/1998 | Driscoll | 707/5 |
| 5,742,816 | * 4/1998 | Barr et al. | 707/104 |
| 5,787,400 | 7/1998 | Weber | 705/1 |
| 5,842,206 | * 11/1998 | Sotomayor | 707/5 |
| 5,860,073 | * 1/1999 | Ferrel et al. | 707/522 |
| 5,869,819 | 2/1999 | Knowles et al. | 235/375 |
| 5,873,081 | * 2/1999 | Harel | 707/3 |
| 5,878,403 | 3/1999 | DeFrancesco et al. | 705/38 |
| 5,883,940 | 3/1999 | Thornton | 379/88.2 |
| 5,884,284 | 3/1999 | Peters et al. | 705/30 |
| 5,896,440 | 4/1999 | Reed et al. | 379/1 |
| 5,898,836 | * 4/1999 | Freivald et al. | 709/2 |
| 6,023,714 | * 2/2000 | Hill et al. | 707/513 |

\* cited by examiner

Primary Examiner—Wayne Amsbury
Assistant Examiner—Thu-Thao Havan
(74) Attorney, Agent, or Firm—Blakely, Sokoloff, Taylor & Zafman LLP

(57) ABSTRACT

A system for providing a form description language for a networked database program is disclosed. In one embodiment of the present invention, a database form is described using a plurality of components. Each component describes a particular item or entity within the database form. The size and placement of each of the various items in a database form is specified relative to the other items. The programming objects defining the structure of the database are created and stored separately from the data objects defining the data entered into the database by a user. A description language interpreter transmitted in conjunction with the database form allows display of the database form by executing the self-contained interpreter.

45 Claims, 11 Drawing Sheets

| EXPRESSION | VALUE | RESULT TYPE |
|---|---|---|
| a+b | addition | a and b are integers: integer |
| a-b | subtraction | one operand is real: real |
| a*b | multiplication | both a and b are real: real |
| a^b | exponent | |
| a/b | division | real |
| +a | a | same as a |
| -a | negation | same as a |
| sin(a) | sine of a | real |
| cos(a) | cosine of a | real |
| tan(a) | tangent of a | real |
| ln(a) | natural logarithm of a | real |
| exp(a) | e(2.718...) to the power of a | real |
| min(a, b, ...) | minimum of a, b, ... | type of minimum expression |
| max(a, b, ...) | maximum of a, b, ... | type of maximum expression |
| sqrt(a) | square root of a | real |

FIG. 4

| NAME | DESCRIPTION |
|---|---|
| &Today | Today's date |
| &LoginID | User's login id |
| &FullName | User's full name |
| &EmpNo | User's employment number |
| &PhoneNo | User's phone number |
| &CostCenter | User's cost center |
| &ProjectID | User's project id |
| &Division | User's division name |
| &Department | User's department name |

FIG. 5

| NAME | TYPE | DESCRIPTION | DEFUALT VALUE |
|---|---|---|---|
| Graphic Component | | | |
| Image | URL | image (GIF or JPG) | "" |
| Checkbox Component | | | |
| text | String | Message displayed next to checkbox | "" |
| state | boolean | initial/default state (false=unchecked) | false |
| group | ID | group to which checkbox belongs | unset |
| Choice Component | | | |
| items | String list | List of items to choose from. | empty list |
| Label Component | | | |
| text | String | Text to display (can have newlines '\n') | "" |
| align | left, center, right | Alignment of text | center |
| valign | top, botom, center, fill | Vertical alignment of text | fill |
| Panel Component, Container | | | |
| title | String | Title of panel | unset |
| borderwidth | integer | Width of border | 0 |
| borderstyle | none, etched, raised | Style of border | etched |
| bordercolor | Color | Color of border | foreground color |
| titlecolor | Color | Color of title string | foreground color |
| TextComponent Component | | | |
| text | String | initial/default text of component | "" |
| columns | integer | Width of component in characters | width of text |
| editable | boolean | If text is editable or not | true |
| TextField Component | | | |
| format | none, data, phone, float, integer, percent, currency, quantity | Formatting for text | none |
| TextArea Component | | | |
| rows | integer | Height of component in rows | about 6 |
| scroll | none, both horizontal, vertical | Scrollbars to display | vertical |

FIG. 6

| NAME | TYPE | DESCRIPTION | DEFUALT VALUE |
|---|---|---|---|
| GRID | | | |
| y | integer | Y position of component | undefined |
| pos | integer pair | Shortcut for x and y | undefined |
| width | integer | Width of component in columns | 1 |
| height | integer | Height of component in rows | 1 |
| dim | integer pair | Shortcut for width and height | 1.1 |
| fill | none, both, horizontal, vertical | Firm policy for component. (how the component fills its allotted space) | none |
| ipadx | integer | Horizontal internal padding (value added to base minimum width) | 0 |
| ipady | integer | Vertical internal padding (value added to base minimum height) | 0 |
| ipads | integer pair | Shortcut for ipadx and ipady | 0,0 |
| anchor | center, north, northeast, east... | Placement of component within allotted space | center |
| insets | integer quad | Padding around component in pixels. Specified top, left, bottom, right. | 0,0,0,0 |
| weightx | real | Relative size (weight) of column | 0,0 |
| weighty | real | Relative size (weight) of row | 0,0 |
| weights | real pair | Shortcut for weightx and weighty | 0,0,0,0 |

FIG. 7

| NAME | TYPE | DESCRIPTION | DEFUALT VALUE |
|---|---|---|---|
| FONT | | | |
| face | Serif SansSerif Monospaced | Font face/type | parent's face |
| size | integer | Size in points | parent's size |
| style | plain, bold, italic, bold-italic, italic-bold | Font style | parent's style |

SCRIPTING LANGUAGE FOR DISTRIBUTED DATABASE PROGRAMMING

CROSS REFERENCE TO RELATED APPLICATION

The present application is related to the following co-pending U.S. Patent Application entitled, "Database Forms With Attached Audit History", having application Ser. No. 09/036,314, and filed on Mar. 6, 1998; which is assigned to the assignee of the present invention, now U.S. Pat. 6,070,177.

FIELD OF THE INVENTION

The present invention relates generally to the field of computer networks, and more particularly to a form description language for a networked database program.

BACKGROUND OF THE INVENTION

Electronic database programs are used in a wide variety of business applications. Virtually all forms of business activity including personnel and product management involve the creation, storage, and management of data. With the advent of computer networks, distributed database processing has evolved so that multiple different users have access to the same database from their individual computers.

Most business databases are large, complex programs that are stored on a central server computer and maintained by dedicated database administrators. As business operations become more complex and the amount and type of data becomes greater and more varied, the creation and administration of databases becomes a greater responsibility for these business organizations.

In a typical client/server model, applications are designed as collections of client and server processes that communicate with one another. Server processes provide a defined service and interact with clients by accepting and responding to their requests. A relational database is a common type of application that is used in a client/server environment. Relational databases store data in the form of tables that allow the data to be viewed and retrieved in many different ways. Relational databases, however, often require complex queries to join together data that may be stored in different tables. Relational databases also often require extensive indexes to maintain the relationships among the various tables and data. Such indexes are prone to failure, thus requiring maintenance to reestablish these relationships.

Another disadvantage of present database systems is that complex databases with many potential users and large amounts of data require large amounts of computing resources and administrative personnel to maintain the data and network connections.

SUMMARY OF THE INVENTION

The present invention discloses a system for providing a form description language for a networked database program. In a method of the invention, a database form is described using a plurality of components. Each component describes a particular item within the database form. The size and placement of each of the various items in a database form is specified relative to the other items. The items include text labels and data entry areas for the input of data by a user. The programming objects defining the structure of the database items are created and stored separately from the data objects defining the data entered into the database form by the user. A form description language interpreter is transmitted to the client computer from a first network server. One or more forms created by the form description language are transmitted to the client from a second network server and are displayed on the client by the interpreter.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which:

FIG. 4 is a table that lists various arithmetic and logical relationships that may be created among components according to one embodiment of the present invention.

FIG. 5 is a table that lists various textfields that may be entered using a default text entry scheme according to one embodiment of the present invention.

FIG. 6 is a table that outlines the attributes of the various components of a form description language according to one embodiment of the present invention.

FIG. 7 is a table that outlines the attributes of the grid element of a form description language according to one embodiment of the present invention.

FIG. 8 is a table that outlines the attributes of the font element of a form description language according to one embodiment of the present invention.

DETAILED DESCRIPTION

Figure 1:
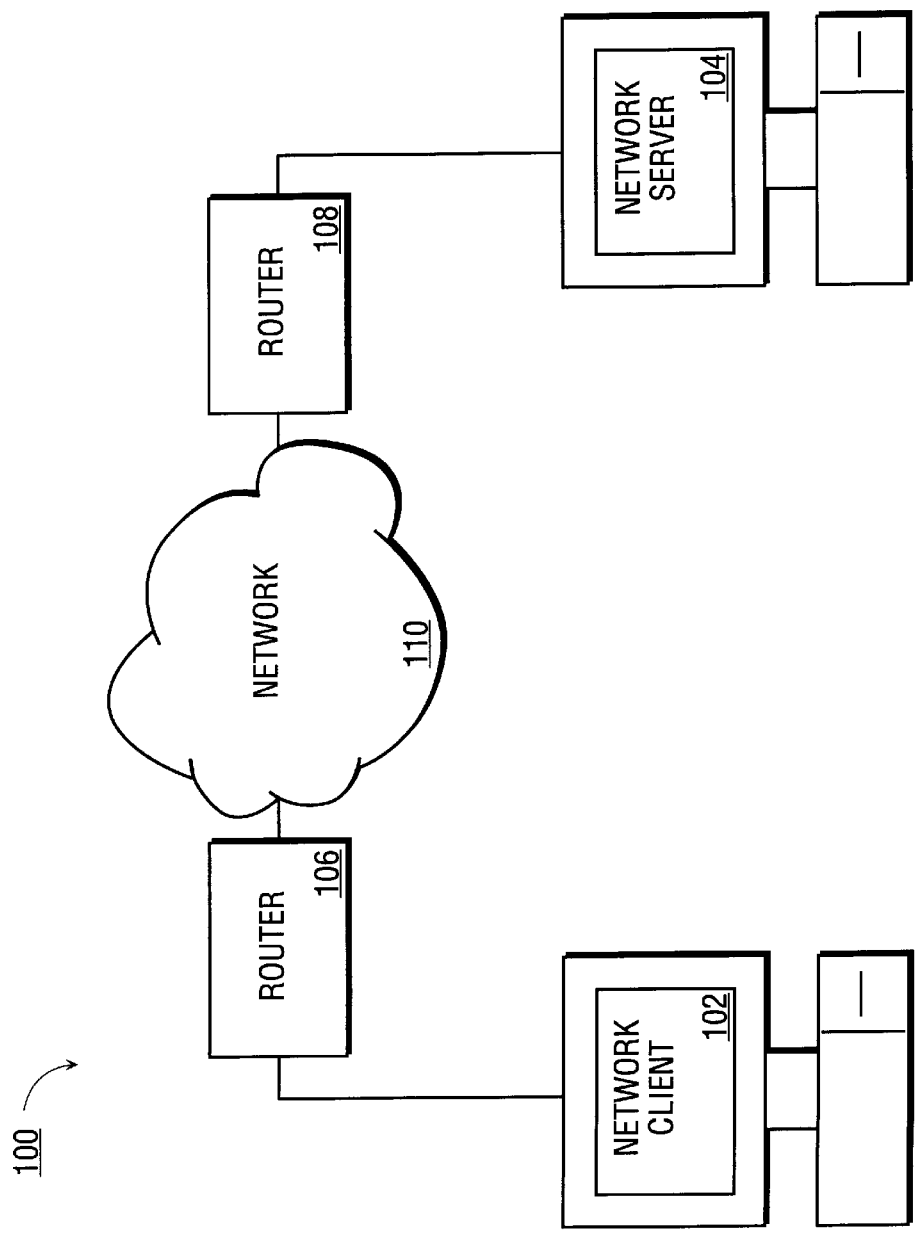
FIG. 1 illustrates a network including client/server computers that transmit and receive data in accordance with one embodiment of the present invention.

A form description language for a networked database program is disclosed. In one embodiment of the invention, a database form is described using a plurality of components. Each component describes a particular item or entity within the database form. The size and placement of each of the various items in a database form is specified relative to the other items. The database form may be downloaded into a client computer and executed using an interpreter downloaded to the client computer.

It is an intended advantage of embodiments of the invention to compactly represent data within a database so that the data may be quickly transmitted among client users in a network, and easily accessed by application programs.

It is a further intended advantage of embodiments of the invention to provide a database system that provides support for a large number of concurrent users without requiring extensive computing or personnel resources.

Hardware Overview

According to the present invention, client computer systems in a network request and receive documents or database files comprising data structures, information and data. According to one embodiment, the steps of transmitting and displaying the document or data, as well as other aspects of the present invention are implemented by a central processing unit (CPU) in a client computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the client computer from a storage device or from one or more other computer systems over a network connection. For example, a server computer may transmit a sequence of instructions to the client computer in response to a message transmitted to the server over a network by the client. As the client receives the instructions over the network connection, the client stores the instructions in memory. The client may store the instructions for later execution or execute the instructions as they arrive over the network connection. In some cases, the downloaded instructions may be directly supported by the CPU. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU. In other embodiments, hardwired circuitry may be used in place of, or in combination with, software instructions to implement the present invention. Thus, the present invention is not limited to any specific combination of hardware circuitry and software, nor to any particular source for the instructions executed by the client computer.

FIG. 1 illustrates a network 100 in which data files are transmitted between networked computers. Client computer 102 is coupled to a server computer 104 through network 110. The network interface between client 102 and server 104 may also include one or more routers, such as routers 106 and 108, which serve to buffer and route the data transmitted between client 102 and server 104. Network 110 may be the Internet, a Wide Area Network (WAN), a Local Area Network (LAN), or any combination thereof. Network server 104 contains application programs and/or data which are accessible over the network by other network stations, such as network client 102. In one embodiment of the present invention, network server 104 is a World-Wide Web (WWW) server which stores data in the form of 'web pages' and transmits these pages as Hypertext Markup Language (HTML) files over the Internet network 110 to network client 102. To access these files, network client 102 runs a 'web browser', which is simply an application program for accessing and providing links to web pages available on various Internet sites. In a typical Internet client-server environment, the client computer accesses the Internet through a single point of contact, commonly referred to as an Internet Service Provider (ISP) or on-line service provider.

Figure 2:
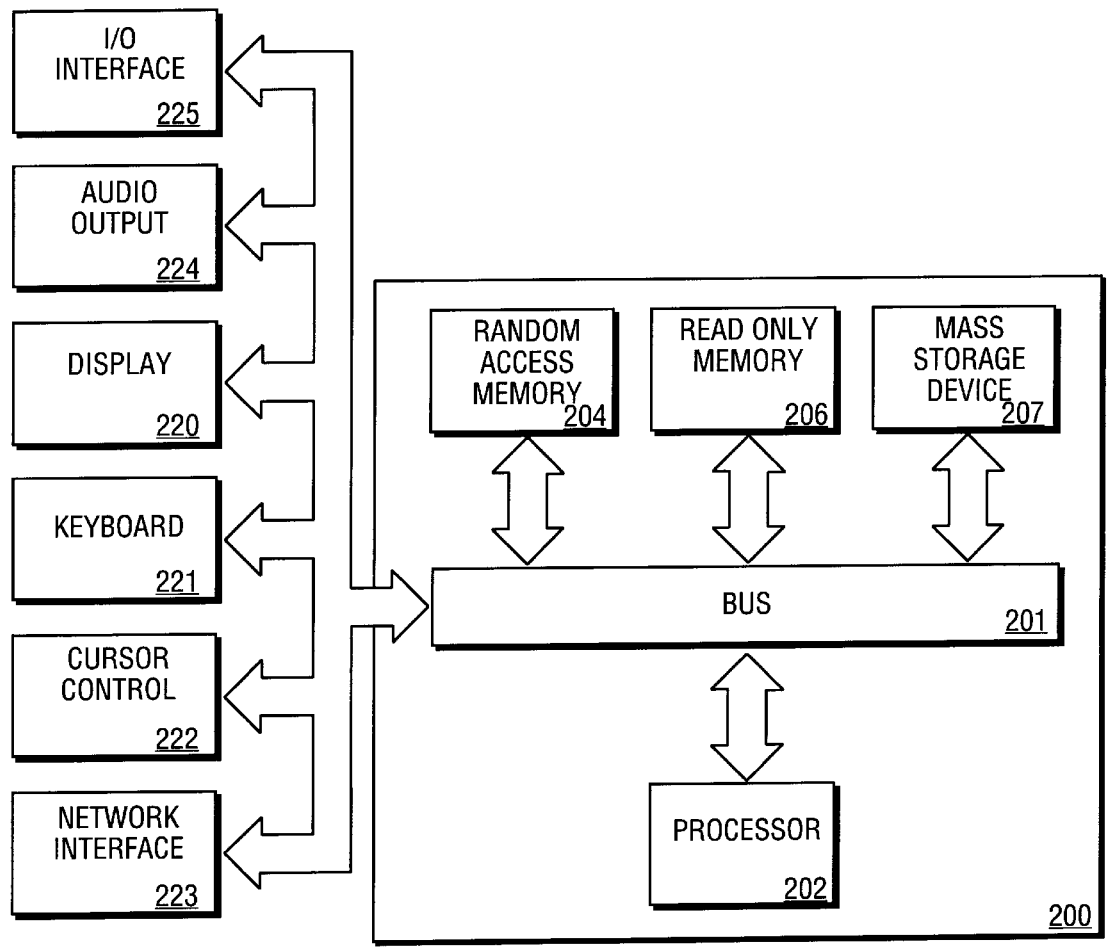
FIG. 2 is a block diagram of a client computer system that implements a database system according to one embodiment of the present invention.

FIG. 2 illustrates a block diagram of a representative client computer such as network client 102 illustrated in network 100 of FIG. 1. The computer system 200 includes a processor 202 coupled through a bus 201 to a random access memory (RAM) 204, a read only memory (ROM) 206, and a mass storage device 207. Mass storage device 207 could be a disk or tape drive for storing data and instructions. A display device 220 for providing visual output is also coupled to processor 202 through bus 201. Keyboard 221 is coupled to bus 201 for communicating information and command selections to processor 202. Another type of user input device is cursor control unit 222, which may be a device such as a mouse or trackball, for communicating direction commands which control cursor movement on display 220. Also coupled to processor 202 through bus 201 is an audio output port 224 for connection to speakers which output the audio content produced by computer 200. Further coupled to processor 202 through bus 201 is an input/output (I/O) interface 225 which can be used to control and transfer data to electronic devices connected to computer 200, such as other computers, tape recorders, and the like.

Network interface device 223 is coupled to bus 201 and provides a physical and logical connection between computer system 200 and the network medium. Depending on the network environment in which computer 200 is used, this connection is typically to a server computer, but it can also be to network router or another client computer. Note that the architecture of FIG. 2 is provided only for purposes of illustration, and that a client computer used in conjunction with the present invention is not limited to this specific architecture.

In one embodiment of the present invention, network client 102 is a personal computer which interfaces to network 110 through a modem, or similar network interface device. In an alternative embodiment the network client 102 represented by computer system 200 may be a dedicated Internet access product, such as a Network Computer (NC).

Form Description Language

In one embodiment of the present invention, the network client 102 illustrated in FIG. 1, sends and receives documents and data structures over network 110 to network server 104. Network server 104 stores and executes application programs that create and store files and data that can be transmitted and further processed by network client 102. Examples of such application programs include database programs, word processing programs, electronic mail ("e-mail") programs, and other like programs. For purposes of the following discussion, such programs will be referred to as "database" programs, however, it should be noted that this term refers to several different types of programs that are capable of storing data of any kind in an organized manner. Likewise, the term "database form" will be used to refer to a graphical or printed representation of a document or form that provides data entry fields and associated labels that describe the fields. The data entry fields could be represented by text input boxes or user selectable option buttons, or the like.

In one embodiment of the present invention, network server 104 executes a database program and stores data created for that program. Network client 102 executes the same database program so that a user of network client 102 can remotely access the data stored in network server 104.

Various types of data relating to different activities can be stored in network server 104 by the database application. For each different activity or type of data, a user can create a form or template to facilitate the entering of data. Such a form consists of a number of fixed fields that indicate the type of data or information to be entered, and data entry fields for the entry of data by the user. For one embodiment of the present invention, a form may be transmitted among computers in a network. A form may be directed from one user to another user, or serially among several users in turn. Some or all of these users may have the ability to modify the data within the form, or they may be allowed only to view the form and not make any changes.

In one embodiment of the present invention, a form description language is implemented to produce compact representations of data in a database. The form description language utilizes a hierarchy of sub-components to describe a database form. This hierarchy facilitates reusability, abstraction from rendering, and ease of user interaction with the database, and reduces development time and database size. By abstracting the form description from any target system, forms can be reproduced on a multitude of different operating systems and environments, such as windowing systems, printers, and internal memory representations for off-line processing. Embodiments of the present invention are included in a scripting language known as VitaScript™. VitaScript is a freeform form description language (VitaScript™ is a trademark of VITA Systems, Inc. of San Mateo, Calif.).

In general, database forms are composed of many small elements or components. At a basic level the most common elements of a form include single line text fields, text areas, check boxes, labels, and possibly some graphic components, such as logos. For computer-implemented forms, pull down lists and option buttons, as used in common graphical user interfaces, are also common. From these basic components many different types of forms can be built.

In one embodiment of the present invention, an additional component is implemented. This component is referred to as a "container", and it serves to build the hierarchical representation of a form. A typical form that is transmitted electronically among users in a database may have two or three main components such as employee information, requested data, and an audit trail. Each of these three areas could be a container of components, and at the top level the form is a container of these three containers. In this hierarchical scheme, containers are themselves components.

A feature of the hierarchical scheme is that complex components are built from much simpler basic components. Such complex components can be reused within a form or among different forms, thus avoiding redundant usage of form elements. For example, if certain employee information or a particular header is common to a set of forms, this area can be designed once and then included in many other forms. This characteristic also ensures that common components maintain a consistent appearance within the same system or organization.

Figure 3:
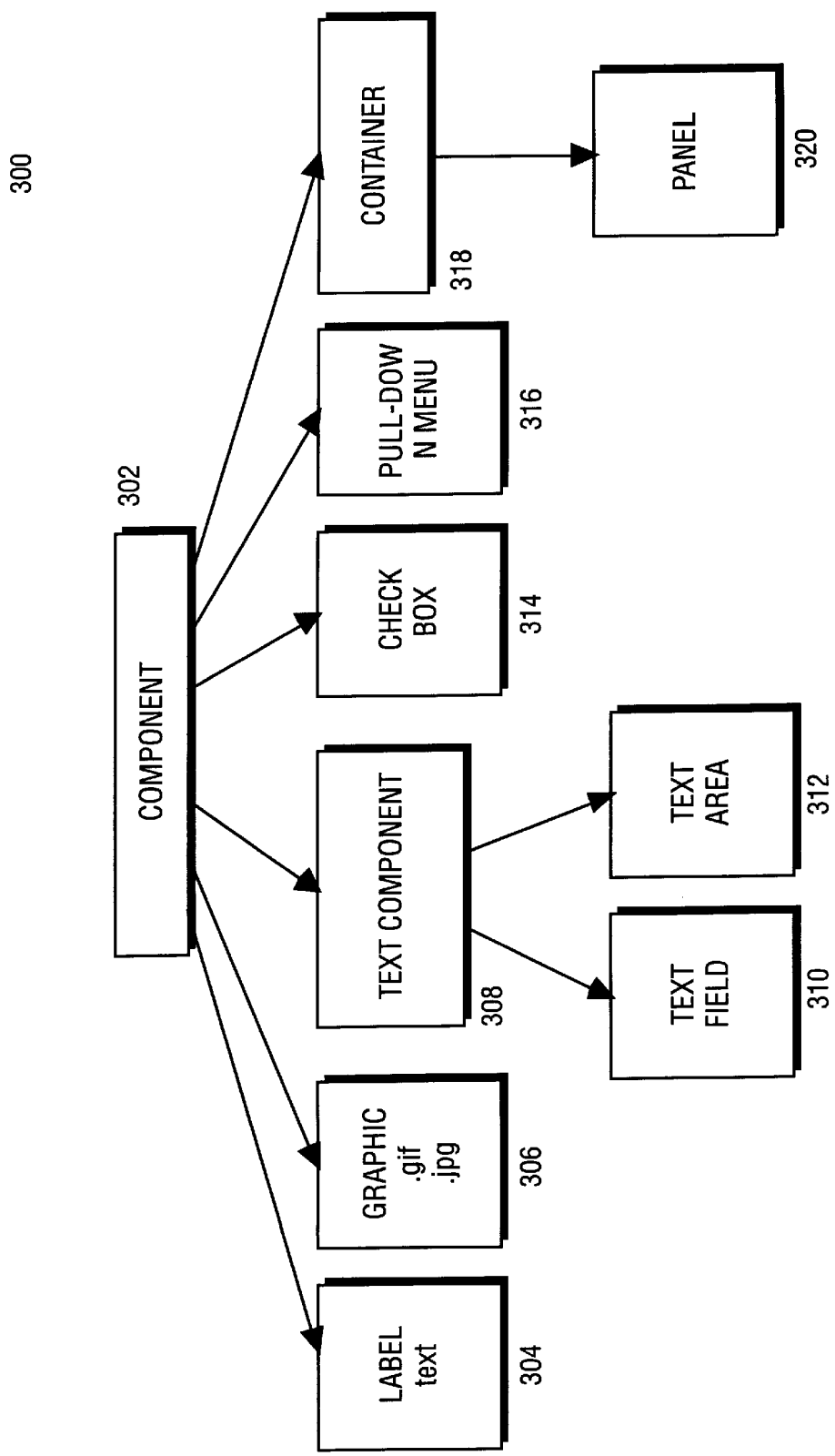
FIG. 3 is a block diagram illustrating the hierarchical structure of form description components according to one embodiment of the present invention.

FIG. 3 is a block diagram 300 that illustrates the hierarchy of the different form elements in the VitaScript form description language. The basic building block of VitaScript is a component 302. The hierarchical structure is achieved by nesting components within other components using a container component. Components within VitaScript also follow a hierarchical structure in their attributes. In one embodiment, VitaScript contains seven usable components which derive common functionality from the base component 302. All attributes of base component 302 are valid within all of the other components. The other components include a label component 304 which comprises text data, a graphic component which comprises graphic data in a specific file format (e.g., .gif or .jpg), a check box component 314 that describes a option button and accepts a yes or no input, and a pull-down menu component 316 such as those found in standard window based graphical user interfaces. Another component is the text component 308. Text component 308 in turn comprises a text field ("textfield") component 310 and text area ("textarea") component 312. A special type of component is the container component 318. The container component includes a panel component 320.

A component in VitaScript has the following syntax:

```
component [name] {
    attribute = value;
    attribute = value;
    . . .
}
```

In this syntax, "component" is the name of the component in lowercase (e.g., textfield). The attributes and values depend on the type of component. The name of a component is optional and is used when the component is referenced elsewhere.

Certain of the components illustrated in FIG. 3 have a value associated with them. For example, the textfield, textarea, choice, checkbox, and label components have a value associated with them. The value corresponds to the internal representation of information that the component displays. Values have types determined by their component and the potential attributes of that component.

Certain components, such as labels, textfields (without formatting), and textareas may contain text or numbers. For these components, if the text contained is an integer or a real number, the value associated with the component is also an integer or real number. Otherwise the internal value of the component is a text string. For a choice, the associated value is the text of the selected item. For a checkbox, the value is a Boolean value representing its state (true or false). Textfields that have formatting, are represented internally as the most appropriate type for the formatting (e.g., date formatting is stored internally as a date object). If the text of a textbox is unrecognizable it behaves like a textfield without formatting (i.e. either an integer, real number, or text).

Components may have their values dynamically updated by setting the value attribute of the component. The value attribute is a special attribute in that it is the only attribute that may be assigned an expression. This expression defines the relation of the value of a particular component relative to the values of one or more of the other components. Thus, if the value of one of the expressions operands change, the value of a dependent component change corresponding to their relationship as defined by the expression. In one embodiment of the present invention, various arithmetic and logical relationships may be created among the components. The various expressions are outlined in Table 400 illustrated in FIG. 4. It should be noted that if a result cannot be computed because of a type error or impossible calculation (e.g., division by zero) the expression will return a not applicable ("N/A") result.

In one embodiment of the present invention, VitaScript also supports default text entry. This mechanism allows for the automatic entry of common data values by defining default values for certain textfields. Default text can be statically defined for textfields by setting the text attribute of a textfield to a string. Whenever a particular form is loaded by a client computer, the textfield will have the default string already entered. Table 500 illustrated in FIG. 5 lists some of the possible textfields that can be entered using default text entry. To fill in default text based upon the user input, or other information ascertainable only when the form is being filled out, VitaScript supports dynamic default values. This is specified by setting the text attribute of a textfield to a default. The syntax for this is as follows:

```
textfield {
    text = &DefaultName;
    // other attributes . . .
}
```

The default name may be any name. If it is unknown, unrecognized, or not ascertainable for some reason, the default value will be the empty string ("").

Form Layout

In one embodiment of the present invention, form components are positioned and sized relative to other components or the container, instead of being sized with exact pixel coordinates. This allows the components to be displayed on a variety of different computer systems and printers. Layout of a form involves laying out components in a form hierarchy. Each component has a preferred size based upon the size of the information it displays or could potentially display. When constrained to a fixed area such as a single sheet of paper, each component in the form can be stretched or compressed to fill the area in a regular and specified manner. Since components are placed relative to other components and not individually pixel by pixel, a complex component can be placed in another container of a form with a minimal amount of effort.

Forms are represented internally in the same hierarchy as the display hierarchy, thus a programming interface can be reused in a similar manner to the components themselves. To layout a form, components must be arranged within a hierarchy of containers.

In one embodiment of the present invention, VitaScript includes a layout manager referred to as the "grid" layout. A grid is a structured element in VitaScript and may only appear in a container. In turn, component definitions may only appear within grids. Using the grid layout, a particular form layout is specified by the name of the layout type followed by a pair of braces that contains the actual layout information. An example of syntax for a grid layout is:

```
panel {
    title = "Example Panel";
    grid {
        . . .
    }
}
```

The area denoted " . . . " is where the components and layout information/constraints are placed.

Underlying the grid layout is a variable sized "grid" or table of components. Each row and each column can have a different size based upon the components and their constraints.

Components are placed into one or more "cells" of the grid. The rectangular group of cells that the component occupies is called its "allocated space," and refers to the size (in pixels) of the cell group. Since the size of rows and columns vary (and can be as little as zero pixels wide), the number of cells that a component occupies often has very little to do with its allocated size. Components occupy a rectangular grid of cells specified by an upper-left cell position, and a cell width and height.

Column widths, and row heights are determined by the components occupying cells within the rows and columns. This minimum width and height of a cell (and thus, row or column) is determined by the component that occupies that cell. In this manner, the grid will adjust its size to accommodate the components within it as best as possible.

When the panel has more space than the components needs, the grid can also grow the rows and columns according to grow "weight" constraints. Weights give components relative sizes within the grid. The relative weights determine how much a component is grown relative to another. A component with twice the weight value of a second component will be twice as big as the second component, provided that it is larger than the minimum size for each component. Thus, if three components are positioned next to each other with horizontal weights of 1.5, 3.0, and 1.0, the first component will be half the size of the middle component, and the middle component will be 3 times as large as the right-most component. As an example, the same effect could be achieved with weights of 3.0, 6.0, 2.0, or 1.0, 2.0, 0.6666.

A special case exists for weight value of 0.0. A weight of zero causes the grid not to grow the component at all. In this case, the component will always be given its "preferred" size.

In this manner, the cell position, width, height, and weights define the region allocated to a component. The component within that region may occupy that region differently depending on constraints applied to it. In one embodiment of the present invention, there are two constraints that effect the actual region occupied. These constraints are referred to as the "anchor" and "fill" constraints. The anchor constraint determines where the component is placed within the allocated region, and the fill constraint determines how the component actually fills the region. For the anchor constraint, the allowed values are "center" and the 8 compass points ("north", "northeast", "east", . . . ). The fill constraint may be one of following values, "none", "horizontal", "Vertical", or "both."

The layout can be modified in a few additional ways. The first and most common is the "insets" constraint. Insets give components a border of background pixels around the component. A similar constraint is the "ipads" constraint which is used to increase the minimum size of a component.

In a container, components are added to the grid after setting the component constraints. Constraints are specified as follows:

```
panel {
    grid {
        constraint = value;
        // . . .
        component {}
        constraint = value;
        // . . .
        component {}
        // . . .
    }
}
```

Each component is constrained to the grid with all constraints previously specified. After a component has been added, the constraints used to add that component remain unchanged. This reduces user input typing and reduces file size, since most often only a cell position change is needed before the next component is added.

Component Attributes

At the lowest level, components are represented as a collection of attributes. Component attributes affect the appearance and behavior of components.

One attribute is referred to as the "value" attribute. The value attribute corresponds to the value of a component. For example, the value of a text field is the actual text entered the field. All components contain this attribute, and it is the only attribute that a user can directly manipulate. The value attribute is also unique in that it is the only attribute with a changeable type.

There are several different types of values that can be used for the value attribute. One type of value is a constant value. Constant values are set in the form description and remain unchanged for the life of the form. A second type of value is a dynamic value. Dynamic values change during the life of the program as the result of a change to another attribute. For example, a component's attribute may be represented as the sum of several other component values. A third type of value is an external value. External values depend on external data not present in the form description script. The actual value of an external value is determined when the form is instantiated and pulled from an external source known to the program.

FIG. 6 is a table that lists the attributes of each component according to one embodiment of the present invention. Table 600 lists the attributes with respect to the name of the component, the type of component, a description, and the default value of the component. Components always have the same attributes available as their parent components. Since the parent of the top-level component is undefined, the default values for the top-level component are undefined.

Attributes for the Graphic component are illustrated in Table 600. Any graphic object specified by a user or another component will be displayed within the Graphic component. If the graphic object is not found, or there is an error in image format, the error will be ignored and the background color will be displayed. Attributes for the Checkbox component are also illustrated in Table 600. Many Checkboxes can be grouped together by setting all checkbox group attributes to the same value. Checkbox group ID's allow only one Checkbox within a group to be selected at a time. The group identifier is dynamically defined as group ID's are specified. If more than one Checkbox per group is specified as initially checked (state is set to true), the result is undefined. Attributes for the Choice component are also illustrated in Table 600. The items for a Choice are specified in a comma separated list. The order of the list is the order that the items will be displayed in the Choice. The first item in the list is the default value.

Attributes for the Label component are illustrated in Table 600. A Label simply displays text. The text may span several lines by inserting newline characters '\n' within the string. The align parameter will align all lines of text horizontally to the left, right, or center. The "valign" attribute is similar to the align attribute but is applied vertically. Specifying valign equal to "fill" will span the text lines evenly within the component.

Attributes for the Panel component are illustrated in Table 600. A Panel contains and arranges components for display on a display device. The panel serves as a graphical user interface that provides a comprehensive arrangement of components for the viewing and entry of data into the database form. The appearance of a panel can be modified by specifying borders and a title. The title will appear in the upper left of the panel. Borderwidth determines the width of the border in pixels. A negative borderwidth effectively inverts the border. Borderstyle specifies the style of the border. An etched border's width in pixels is twice the borderwidth.

Attributes for the Textfield and TextComponent components are also illustrated in Table 600. A TextField is a user editable line of text. If formatting is applied to the text, the input is constrained to valid strings for that format, and internally processed as a value of the formatted type. For example, a textfield with format set to "date" would have a date as a value rather than a text string as a value. Integer formatting corresponds to integers in plain format (i.e. "12345"). Quantity is similar to integer, but commas are inserted as appropriate (e.g., "12,345"); Currency is used for monetary values (e.g., "$1.25"); Percent is a percentage value (e.g., "23%"); Float is a real number (e.g., "12.345"); Date is a date value (e.g., Jan. 23, 1998); and None is used for standard text input, with no special processing. The TextComponent component is the abstract parent of TextField and TextArea.

FIG. 7 is a table that lists the attributes for the grid element within Vitascript according to one embodiment of the present invention. These attributes include the position and size of the components, as well as weights for the components that define the size of components relative to other components.

Another structured element within VitaScript, similar to grid, is font. Font definitions may appear in any component definition. FIG. 8 is a table that lists the attributes of the font element according to one embodiment of the present invention. The font attributes include the size, style and face characteristics of the text characters as displayed on the display device or printed on a printer.

Formatting

Basic components have format attributes that affect their appearance. For example, the preferred width and color of a component are common format attributes. Components such as text fields can be specialized to a specific application by attaching a format attribute, such as a currency or date format to a field. Setting the format of a text field has many effects. For the user interface, the field is automatically parsed and reformatted to conform to whatever standard for which the form was designed (e.g., company policy may require dates be formatted as MM/DD/YYYY). Internally, formatting specifies the type of the value attribute of the component, thus, integer fields are internally represented and manipulated as integers.

Linking

Much of the act of filling out forms involves some duplication of work. For example, most common forms within a business organization require a minimum amount of common information, such as employee name, employee ID, date, and so on. In other areas of a typical form, the same information has to be filled out multiple times. In one embodiment of the present invention, a technique referred to as attribute linking facilitates the entry of common information.

Attributes in the form description language are strongly typed, much like high level programming languages. Each attribute has a type associated with it, with the exception of the value attribute whose type is determined by the format of the component.

As described above, VitaScript is a freeform form description language. As such, certain lexical rules apply to the construction of VitaScript instructions. These lexical rules may vary from one implementation to the next, and will depend primarily on the actual implementation of the VitaScript system. Lexical rules can be established for specific implementations using established rules and conventions presently used and understood by those of ordinary skill in the art.

Although the VitaScript form description language has been described by specific programming examples according to one embodiment of the present invention, it is to be understood that the data structures and components of VitaScript may be constructed using other object oriented languages, such as C++.

Database Implementation

In one embodiment of the present invention, the form description language, VitaScript, is used to enter data on a client computer, such as client 102 in FIG. 1. The database forms and other graphical user interface elements are provided to the client computer from a database server computer, such as server 104. In one embodiment, client 102 executes a Java™-enabled Web browser. Java is a trademark of Sun Microsystems, Inc. in the United States and other countries. The form description files and data storage resources are stored on and made available from server 104 over the Internet, and can be accessed by the client over the World-Wide Web ("Web") by executing an appropriate applet provided by the server. The applet is executed using a Java Virtual Machine (JVM) running in the Web browser in the client computer. This implementation eliminates the need to execute special client software, and ensures that databases can be created on a wide variety of different client computer systems. Moreover, the use of a Web browser enables databases and files created by VitaScript to be easily transferred among different network computers using simple communication models, such as electronic mail ("e-mail").

Figure 9:
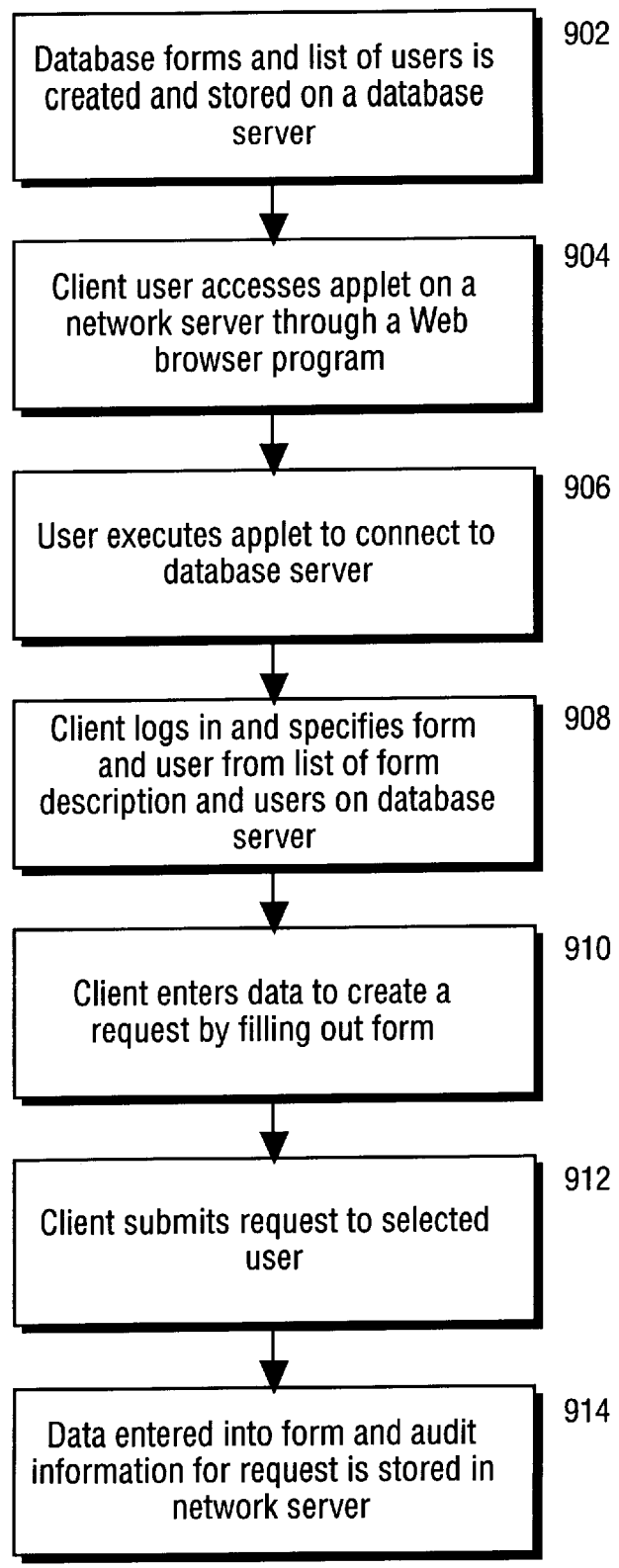
FIG. 9 is a flow chart that outlines the steps of implementing a database using the VitaScript form description language on a client computer, according to one embodiment of the present invention.

FIG. 9 is a flow chart that outlines the steps of implementing a database using VitaScript and entering data on a client computer, according to one embodiment of the present invention. In step 902, the database forms and a list of users of the forms are created and stored on a database server (also referred to as a "Vita Server"). The forms are created using the VitaScript form description language described previously. To access the database forms from a client computer, a client user accesses a VitaScript applet through a Web browser program, step 904. The applet is a program that is executable within the Web browser and provides access to VitaScript on the client computer. User access is performed by the user requesting an HTML (Hypertext Markup Language) page from an HTTP (Hypertext Transport Protocol) server. This is typically accomplished by simply entering the URL (Uniform Resource Locator) string for the HTTP server in the Web browser on the client computer. The applet may be stored on an HTTP server that is a different server than the database server, or it may be stored on the database server.

In response to the user request, the HTTP server sends back an HTML page containing the applet codebase, applet code, and archive files. The applet codebase comprises the directory where the classes reside, and the applet code contains the main initialization class for VitaScript. In step 906, the client user executes the applet to connect to the database server. In one embodiment of the present invention, the applet contains a VitaScript interpreter and software that produces a graphical user interface for the database forms on the client computer. In step 908, the client user logs into the system and specifies the form to be filled out and the other user or users who are to receive the data or request. The form may be selected by specifying a form ID number that is assigned to each different form. After the user has selected a particular form, the applet builds the internal structures for that form and produces a displayable representation of the form on the client computer. The internal structures include dependent relationships among the data contained within the various fields of the form, i.e., arithmetic and logical relationships among data fields or cells. The dependent relationships also include the relative position and sizes of the fields as they are displayed on the screen or printed on a printer.

In step 910, the user enters the appropriate data into the form. Typically, this data would constitute a request relating to a particular service or product desired by the user. Within a typical business organization, forms may be used to provide data entry for a wide variety of activities. For example, forms could be provided for sales reports, supply requests, vacation requests, expense reports, reimbursement requests, or any other activity that requires the circulation of reports or documents among different personnel or users in a computer network. Each instance of a form and the data within the form comprises a request. Once the user has formulated a request by entering data into a form, the user submits the form to the next user, step 912. The next user corresponds to the user selected in step 908.

The data entered into a form, and constituting a request, is stored in a data storage device in the database server computer, step 914. Because the form description data is provided separately from the database server, only the data comprising the request need be saved. No data relating to the form, or the particular organization of the data need be saved with the data. This allows for a very compact representation of request data, and provides for reduced storage requirements and faster processing and transmission time.

In one embodiment of the present invention, the data for each request is stored as a Binary Large Object ("BLOB") data type. A Binary Large Object is a variable-length data type that is commonly used to store complex data, such as graphics images, audio data, and other non-textual data. Since the data represents only specific values and no structure definitions, this representation allows the request data to be read into many different post-processing processes.

In one embodiment of the present invention, information regarding creation and routing, and possible modification of a request is also stored in the database server. This information may be stored as an audit trail that provides a log of transmission and other activity taken by users with respect to the request. This audit trail may be made available to a system administrator or the users of a particular request. The audit trail data is stored and maintained separately from the data comprising a request. The audit trail data is typically provided by the database server upon the occurrence of a particular event. For example, user ID's are entered upon user log-in or receipt of a request, and time of receipt is provided by a system clock on the database server information regarding a document or form is maintained separately from the form itself and the data stored in the form. Other items of information relating to transmission of a form, such as comments or specific activity by users, may be entered by the users directly. In general, however, critical information that provides an accurate audit trail for the request is not directly accessible by the users in order to maintain the integrity of the audit information.

As stated above, a VitaScript interpreter is downloaded into the client computer when the user downloads the applet from the network server (step 904 in FIG. 9). In an alternative embodiment of the present invention, the VitaScript interpreter is downloaded with the form description (step 908 in FIG. 9). Upon execution by the client user, the interpreter parses the VitaScript code as it is received by the client computer. The parser assigns user input values to the corresponding text fields. These values define the relationship of the text fields in relation to the other fields. The parser then generates an internal representation of the fields. This may be most commonly implemented as a tree-structured representation, however, other ordered representations may be used. In one embodiment, the parser implements a constant folding scheme to minimize calculations. Constant folding involves resolving arithmetic or logical relationships that yield the same result in a number of different instances.

In one embodiment of the present invention, the VitaScript interpreter implements a real-time revision mechanism that updates all related or dependent fields when one particular field is modified. A message is transmitted up the tree to notify all relevant fields that a related field has been modified. These fields will then request the modified value, and recompute their own values based on the modified value.

In an alternative embodiment of the present invention, a VitaScript compiler is used in conjunction with the VitaScript interpreter. The compiler is provided as part of the server or administrative tools. When a form is created on the database server, the compiler is used to translate the high-level VitaScript instructions directly into an intermediate language. For example, the compiler may transform the instruction element for "textfield" to "t" and "label" to "l". This allows a more compact compiled version of each form to be stored in the database server and transmitted to the client, thus reducing storage requirements and decreasing transmission time. For this embodiment, the interpreter executed on the client computer must be modified to recognize the compiled VitaScript instructions.

Storage and Retrieval of Form Contents

Saving the contents of a request created by VitaScript is a relatively straightforward task due to the streamlined structure of the form data. On the most basic level, since the form is a container, only the value attribute of the form need be stored. The value of the container is a list of its contained components and thus the value of the hierarchy below it.

In one embodiment of the present invention, certain fields are not saved in order to reserve storage or memory resources and further compact the representation of the data. For example, constant components are not stored since their value is contained completely in the form script. Likewise, dynamic components are not stored since their value can be calculated from other components. In one embodiment of the present invention, the only components that are stored are the components whose value depends directly on user input. Thus, a recursive descent through the component hierarchy that writes out data from such components is sufficient to save the contents of the form.

In certain instances, external variables referenced by the script must also be stored since their values may changed between the time of storage and the time of retrieval (e.g., a date value). In one embodiment of the present invention, external variables are made constant so that after a form has been filled out, its contents remain constant.

Retrieval of the contents of a form follows the same recursive descent through the forms hierarchy as storage of the form, and simply loads the previously saved values into the components. External variables, as mentioned above, must also be restored and made constant.

Figure 10:
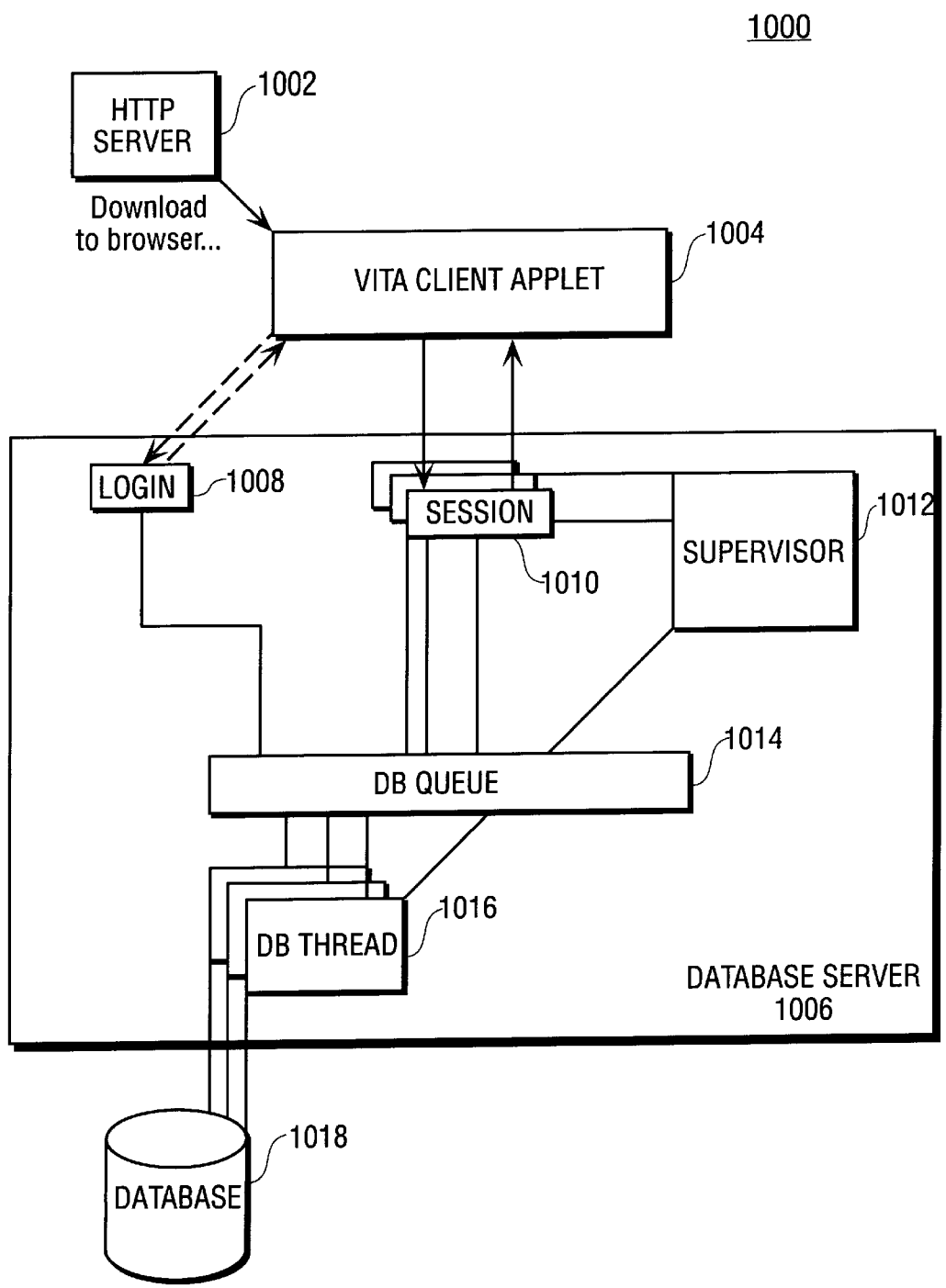
FIG. 10 is a block diagram that illustrates the components of the VitaScript system according to one embodiment of the present invention.

FIG. 10 is a block diagram that illustrates the components of a VitaScript system according to one embodiment of the present invention. The main components within block diagram 1000 are the HTTP server 1002, database client computer 1004 and database server computer 1006. To initiate a VitaScript session to formulate and submit a request, client 1004 downloads a client applet from HTTP server 1002. The client user initiates a session by logging into the database server 1006. The log-in is handled by a log-in thread 1008 on the database server 1006. The log-in thread 1008 authenticates the user and connects back to the applet if the client user is authorized. In one embodiment, user sessions may only be established through the log-in thread. This provides a secure system and a control mechanism for limiting users to the system. The log-in thread 1008 communicates to the database 1018 through database queue 1014 and database thread 1016.

The client's session with the database server is managed by a session thread 1010. The main task of the session thread is to handle the requests from the client. Client requests are passed to database 1018 through database queue 1014. Database queue 1014 basically establishes an ordered queue of work to be processed by one or more database threads 1016. Database threads 1016 manage the connections to database 1018. Database 1018 is the storage area for the various data and lookup tables utilized in the VitaScript system. In one embodiment of the present invention, database 1018 includes various tables, such as lookup tables (e.g., for the list of users), transaction tables (e.g., to maintain the audit trails), and search facility tables. Each of these tables contains or points to the relevant data comprising that database. A supervisor thread 1012 monitors the system and performs administrative tasks.

The block diagram of FIG. 10 will be used to describe the process flow during a user request operation. Once a user has logged in, the user specifies a form to be used through the client applet on client computer 1004. The user inputs the data into the form. This data is transmitted by the session manager 1010 through database queue 1014 and database thread 1016 to database 1018. The data input into the form and corresponding to the request is then stored in database 1018, and information regarding the request transaction is also stored in database 1018. The user will then submit the request to another user in the network. Depending on the network environment used to implement the VitaScript system, the second user will be alerted to the presence of a request. In one embodiment of the present invention, the VitaScript system is implemented using an e-mail system in which "in" boxes and "out" boxes are used to send and receive requests. A user may be alerted to the presence of a request through a notification system such as a graphical flag being set in the user interface, or an audible tone being produced on their computer. Upon receiving a request, the second user logs into the system, and pulls the data comprising the request from database 1018 through session manager 1010, database queue 1014, and database thread 1016.

Figure 11:
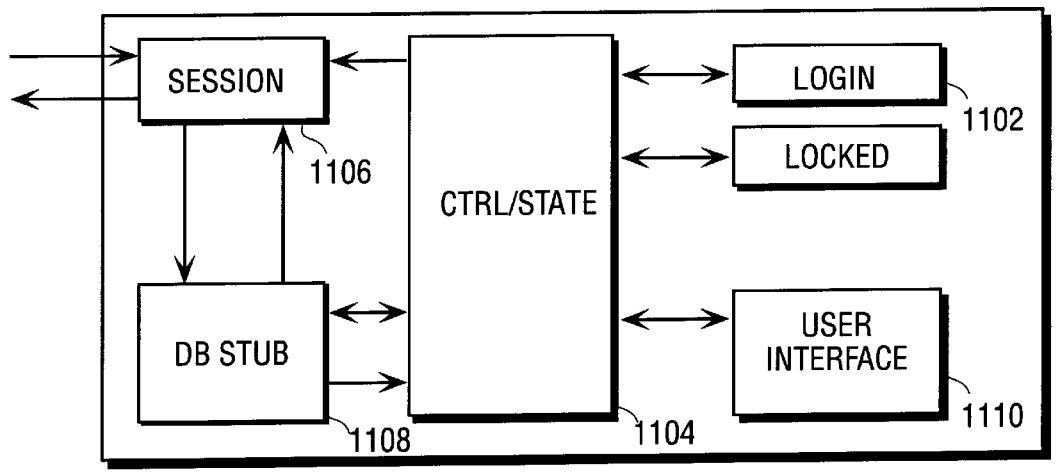
FIG. 11 is a block diagram the illustrates components within the VitaScript client applet according to one embodiment of the present invention.

FIG. 11 is a block diagram the illustrates components within the VitaScript client applet according to one embodiment of the present invention. A control/state process 1104 transmits session information to session thread 1106, and log in information to log-in thread 1102. The session thread 1106 and control/state process 1104 are both connected to the database through database stub 1108. The client applet also contains a user interface 1110 that produces a displayable representation of the forms on the client computer.

Figure 12:
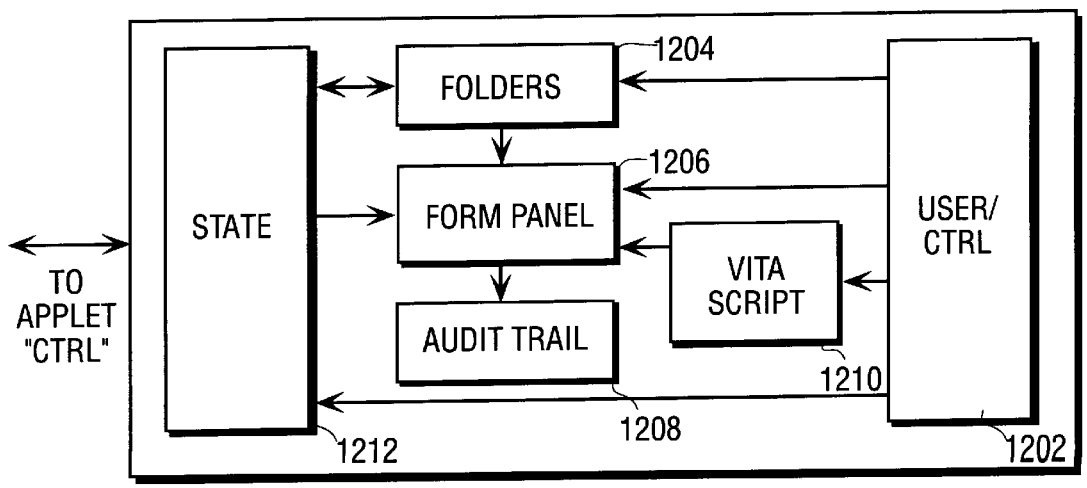
FIG. 12 is a block diagram that illustrates relationship between the applet elements and VitaScript components according to one embodiment of the present invention.

FIG. 12 is a block diagram that illustrates relationship between the applet elements and VitaScript components according to one embodiment of the present invention. The VitaScript components include a folders component 1204, a form panel 1206, and an audit trail 1208. A user/control process 1202 controls the input of data to form panel 1206 through a VitaScript process 1210. The user/control process 1202 also controls the folders component 1204. The audit trail component 1208 is created by data in form panel component 1206. The form panel component 1206 and folder component 1204 are also controlled by state process 1212. State process 1212 is, in turn, controlled by user/control process 1202.

Figure 13:
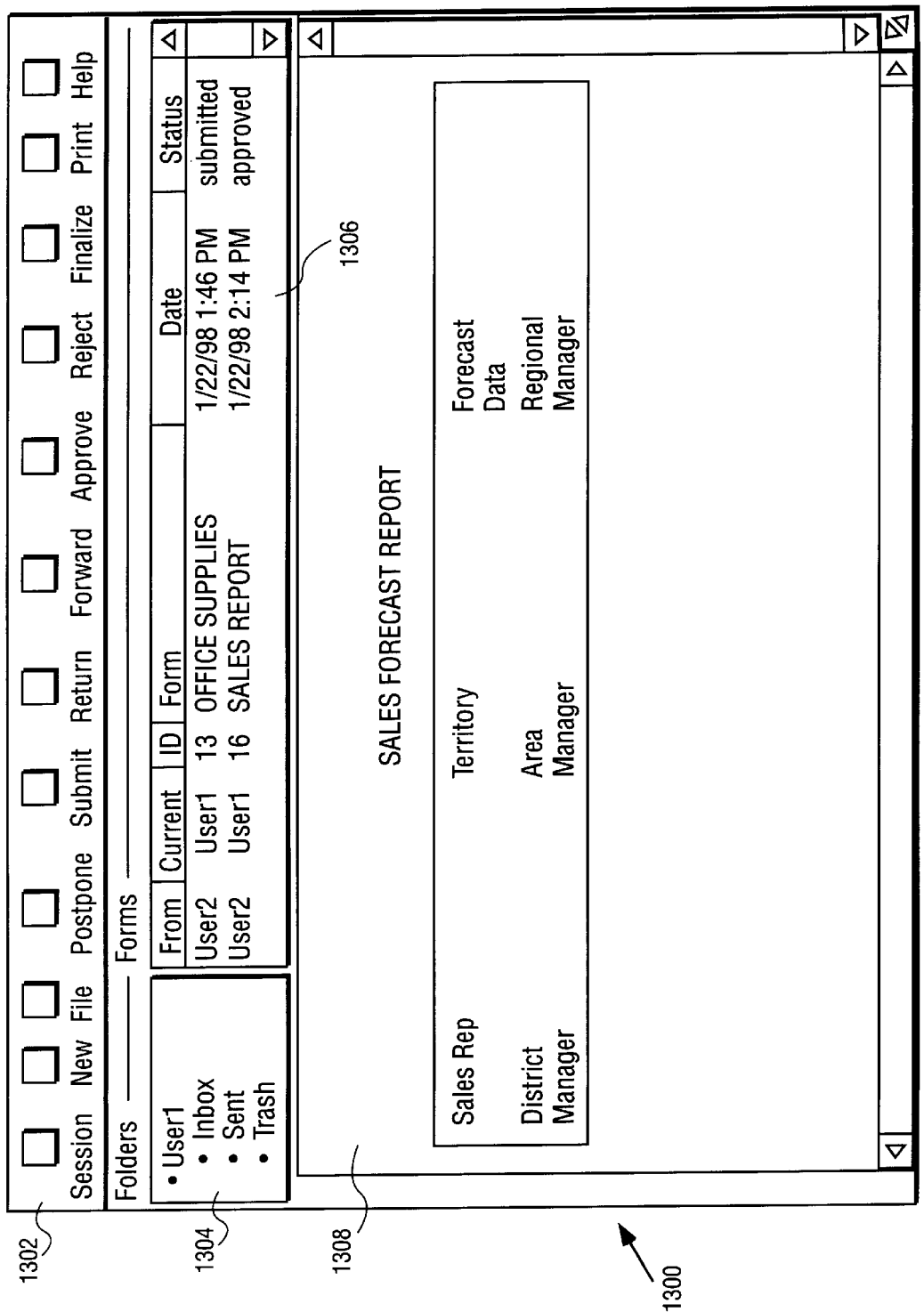
FIG. 13 illustrates a user interface screen for the VitaScript system according to one embodiment of the present invention.

In one embodiment of the present invention, user interface 1110 in the client applet illustrated in FIG. 11 produces a displayable representation of the forms used to formulate requests. In addition, the VitaScript database environment is displayed in the form of a "desktop" metaphor with display areas for documents, file directory, option buttons, and similar items. Upon logging into the database server, a user interface screen is displayed on the client computer. FIG. 13 illustrates a user interface screen for the VitaScript system according to one embodiment of the present invention. It should be noted that the display screen of FIG. 13 is provided for example only, and that many variations or other representations of a graphical user interface for the VitaScript system are possible. User interface display 1300 comprises an activity selection area 1302. This area provides icons or selectable option buttons for specifying actions to be performed during a session. The "session" button initiates a VitaScript session, and the "new" button brings up a new form to be filled out. In one embodiment, the "new" button brings up a list of forms that are available to be used. Other actions available to the user include submitting a request, returning a request, forwarding a request, approving or rejecting a request, finalizing a request, or printing a request, among other such actions.

A folder display area 1304 provides icons for folders used by the user in relation to the VitaScript system. An "inbox" provides access to requests or documents sent by other users and received by the user. The "sent" folder stores requests or documents sent to other users by the user. The "drafts" folder provides a storage area for documents or requests being worked on by the user, and the "trash" folder allows the user to conveniently delete documents or requests.

A forms display area 1306 displays an audit trail of the form currently being displayed on the client computer, and the form display area 1308 displays the form currently being used by the user. As illustrated in FIG. 13, a form entitled "Sales Forecast Report" is currently being used by user 1. User 1 could either be using the current form to formulate a request to be submitted to a second user, or user 1 could be viewing a request submitted by a second user.

The desktop metaphor implemented by the VitaScript system provides a convenient and familiar interface for users to manipulate data in various databases. It also allows documents and database files to be transmitted among users in a network in an electronic-mail like fashion, thus streamlining communication among these users.

In the above description, the VitaScript system was described as a form description language in the context of creating and displaying database forms for the input of data by users in a network. It should be understood, however, that the VitaScript system is also applicable in other network applications that involve the creation and transmission of structured graphical user interface objects among users in a network, and the input and transmission of data using these objects by certain of these users. For example, the VitaScript system could also be used in a dedicated or special-purpose network client such as a "set-top box", personal digital assistant (PDA), or similar client device. In such an application, the client is typically used to control a separate electronic or communication device coupled to the network. The graphical user interface used to configure and operate these clients and other associated devices typically comprises a display screen that includes option buttons or command fields for the input of configuration and operational data. The objects comprising the graphical user interface components for these clients is similar to the objects in a database form in that they include label components and user input components. In accordance with the VitaScript system, the program code for building and displaying the graphical user interface structure is created and stored separately from the data comprising the user input. Moreover, the graphical user interface code is executed on the client through an interpreter concurrently downloaded to the client, or previously downloaded to the client. As described above in relation to the database form application, the components used to generate the graphical user interface may be defined in relation to one another with respect to their input data values and/or their position and size as displayed on a display device.

In the foregoing, a system has been described for providing database forms and documents that may be transmitted among users in a network. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising the steps of:

storing a document description file on a first computer;

transmitting said document description file to a second computer upon said second computer executing an executable program, wherein said second computer is coupled to said first computer over a network;

producing a graphical user interface on said second computer, said graphical user interface comprising a form created by said document description file, said form comprising a plurality of fields, said fields comprising labels and text input areas;

receiving data input into said data input areas; and storing said data in a non-volatile memory.

2. The method according to claim 1 further comprising the step of storing said executable program on a third computer, wherein said third computer is coupled to said second computer over a second network.

3. The method according to claim 2 further comprising the step of transmitting an interpreter file to said second computer, wherein said interpreter file contains instructions which instruct said second computer how to interpret said document description file.

4. The method according to claim 2 wherein said interpreter file is contained within said executable program.

5. The method according to claim 2 wherein said interpreter file is downloaded with said document description file.

6. The method according to claim 1 further comprising the step of pre-compiling said document description file prior to storing on said first computer.

7. The method according to claim 1 wherein the contents of one or more fields depends on the contents of one or more other fields of said plurality of fields.

8. The method according to claim 1 further comprising the step of displaying said plurality of fields on a display device coupled to said second computer, wherein a position of one or more fields of said plurality of fields depends upon the position of a first field, and wherein the size of said one or more fields depends upon the size of said first field.

9. A computer-implemented method comprising the steps of:
   transmitting a first set of instructions from a first computer to a second computer in a network;
   transmitting a second set of instructions from said first computer to said second computer, said second set of instructions comprising instructions instructing said second computer how to interpret said first set of instructions;
   generating on said second computer a graphical user interface produced by said first set of instructions, said graphical user interface comprising a plurality of fields, and wherein one or more characteristics of one or more fields of said plurality of fields depends on characteristics of one or more other fields of said plurality of fields; and
   storing data input by a user of said second computer in data input fields of said plurality of fields, wherein said data input is stored separately from data of said first set of instructions and describing a structure of said graphical user interface and said plurality of fields.

10. The method according to claim 9 wherein said one or more characteristics comprises a position of said one or more fields as displayed on said second computer.

11. The method according to claim 9 wherein said one or more characteristics comprises a data value stored in said one or more fields.

12. The method according to claim 9 wherein said first set of instructions is transmitted with said second set of instructions.

13. The method according to claim 9 wherein said first set of instructions comprises a form description language comprising instructions for the generation and display of a database form on said second computer, and said second set of instructions comprises a form description language interpreter.

14. The method according to claim 9 wherein said first set of instructions comprises a form description language comprising instructions for the generation and display of a graphical user interface providing data entry fields for the entry of data operable to configure and control an external device from said second computer, and said second set of instructions comprises a form description language interpreter.

15. The method according to claim 13 wherein said first set of instructions is pre-compiled prior to transmission to said second computer.

16. A computer-implemented method for sending a form from a first device to a second device, the computer-implemented method comprising the steps of:
   a) receiving at said second device a form script language interpreter for interpreting components of said form;
   b) receiving at said second device a component for said form, said component written in said script language, said component containing at least one additional component; and
   c) displaying said form on a display device in accordance with an interpretation provided by said interpreter of said components.

17. The computer-implemented method of claim 16 wherein said script language interpreter and said components are received together.

18. The computer-implemented method of claim 16 wherein said at least one additional component is a label component.

19. The computer-implemented method of claim 16 wherein said at least one additional component is a graphic component.

20. The computer-implemented method of claim 16 wherein said at least one additional component is a text component.

21. The computer-implemented method of claim 20 wherein said text component further comprises a text attribute.

22. The computer-implemented method of claim 21 wherein said text component further comprises a columns attribute.

23. The computer-implemented method of claim 20 wherein said text component further comprises a text field component.

24. The computer-implemented method of claim 23 wherein said text field component further comprises a format attribute.

25. The computer-implemented method of claim 20 wherein said text component further comprises a text area component.

26. The computer-implemented method of claim 25 wherein said text area component further comprises a rows attribute.

27. The computer-implemented method of claim 16 wherein said at least one additional component is a check box component.

28. The computer-implemented method of claim 16 wherein said at least one additional component is a pull down menu component.

29. The computer-implemented method of claim 16 wherein said at least one additional component is a panel component that comprises a grid layout.

30. The computer-implemented method of claim 29 further comprising placing one of said components in cells of said grid to build said form.

31. An article of manufacture for sending a form from a first device to a second device, said article of manufacture embodying a program of instructions executable by a machine, said program of instructions including instructions for:
   a) receiving at said second device a form script language interpreter for interpreting components of said form;
   b) receiving at said second device a component for said form, said component written in said script language, said component containing at least one additional component; and
   c) displaying said form on a display device in accordance with an interpretation provided by said interpreter of said components.

32. The article of manufacture of claim 31 wherein said script language interpreter and said components are received together.

33. The article of manufacture of claim 31 wherein said at least one additional component is a label component.

34. The article of manufacture of claim 31 wherein said at least one additional component is a graphic component.

35. The article of manufacture of claim 31 wherein said at least one additional component is a text component.

36. The article of method of claim 35 wherein said text component further comprises a text attribute.

37. The article of manufacture of claim 36 wherein said text component further comprises a columns attribute.

38. The article of manufacture of claim 35 wherein said text component further comprises a text field component.

39. The article of manufacture of claim 38 wherein said text field component further comprises a format attribute.

40. The article of manufacture of claim 35 wherein said text component further comprises a text area component.

41. The article of manufacture of claim 40 wherein said text area component further comprises a row attribute.

42. The article of manufacture of claim 31 wherein said at least one additional component is a check box component.

43. The article of manufacture of claim 31 wherein said at least one additional component is a pull down menu component.

44. The article of manufacture of claim 31 wherein said at least one additional component is a panel component that comprises a grid layout.

45. The article of manufacture of claim 44 further comprising placing one of said components in the cells of said grid to build said form.

* * * * *